J. C. BARBER.
CAR TRUCK.
APPLICATION FILED APR. 22, 1910.
962,937.
Patented June 28, 1910.
4 SHEETS—SHEET 1.
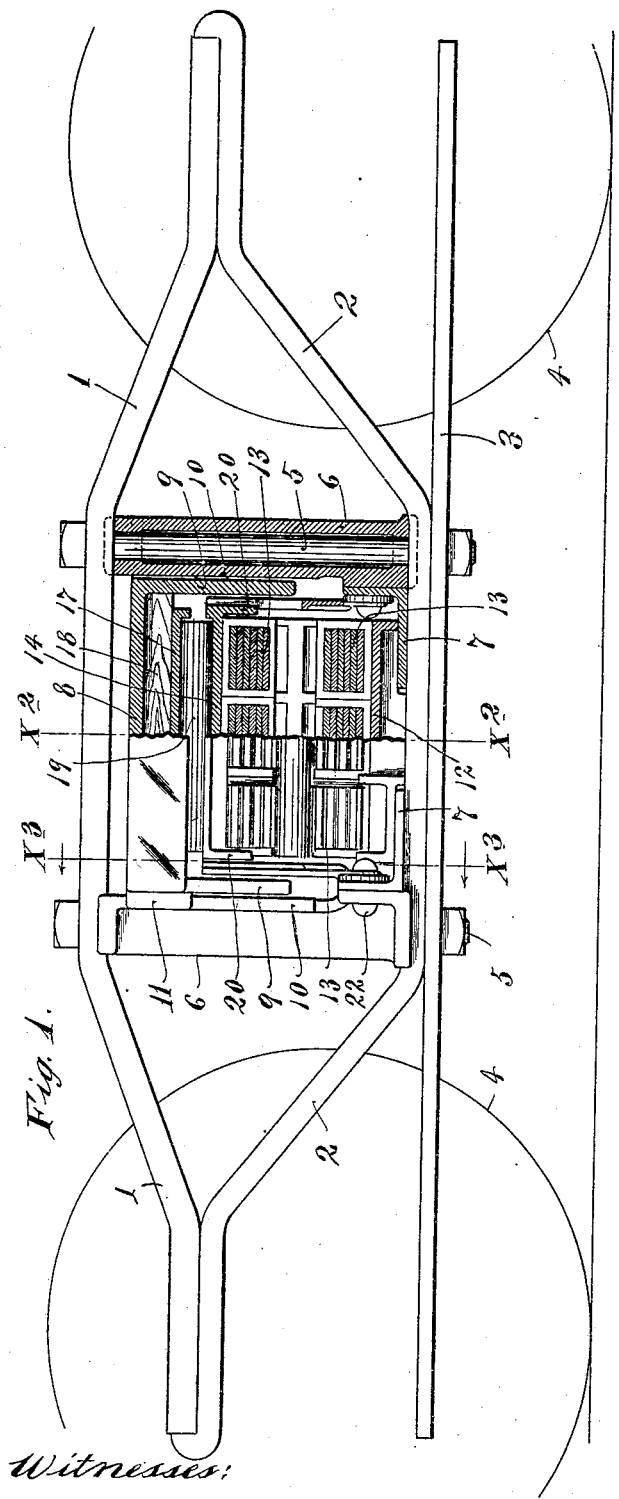
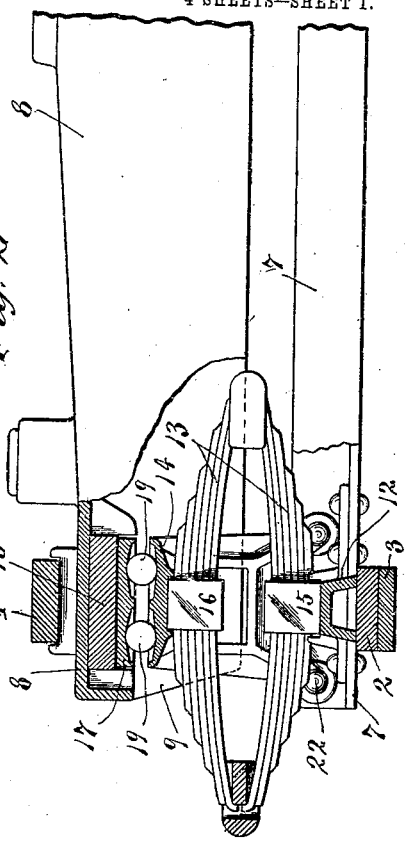
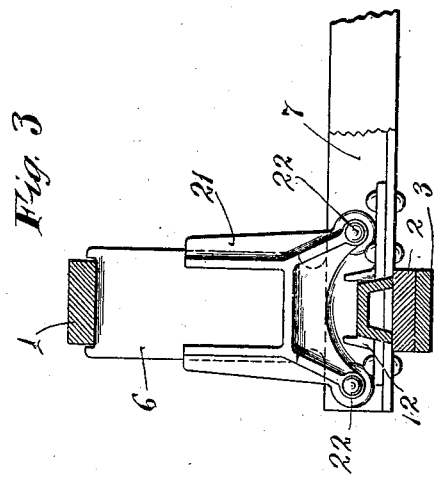
Witnesses:
W. H. Souba,
A. H. Opsahl.
Inventor:
John C. Barber,
By his Attorneys:
Williamson & Merchant

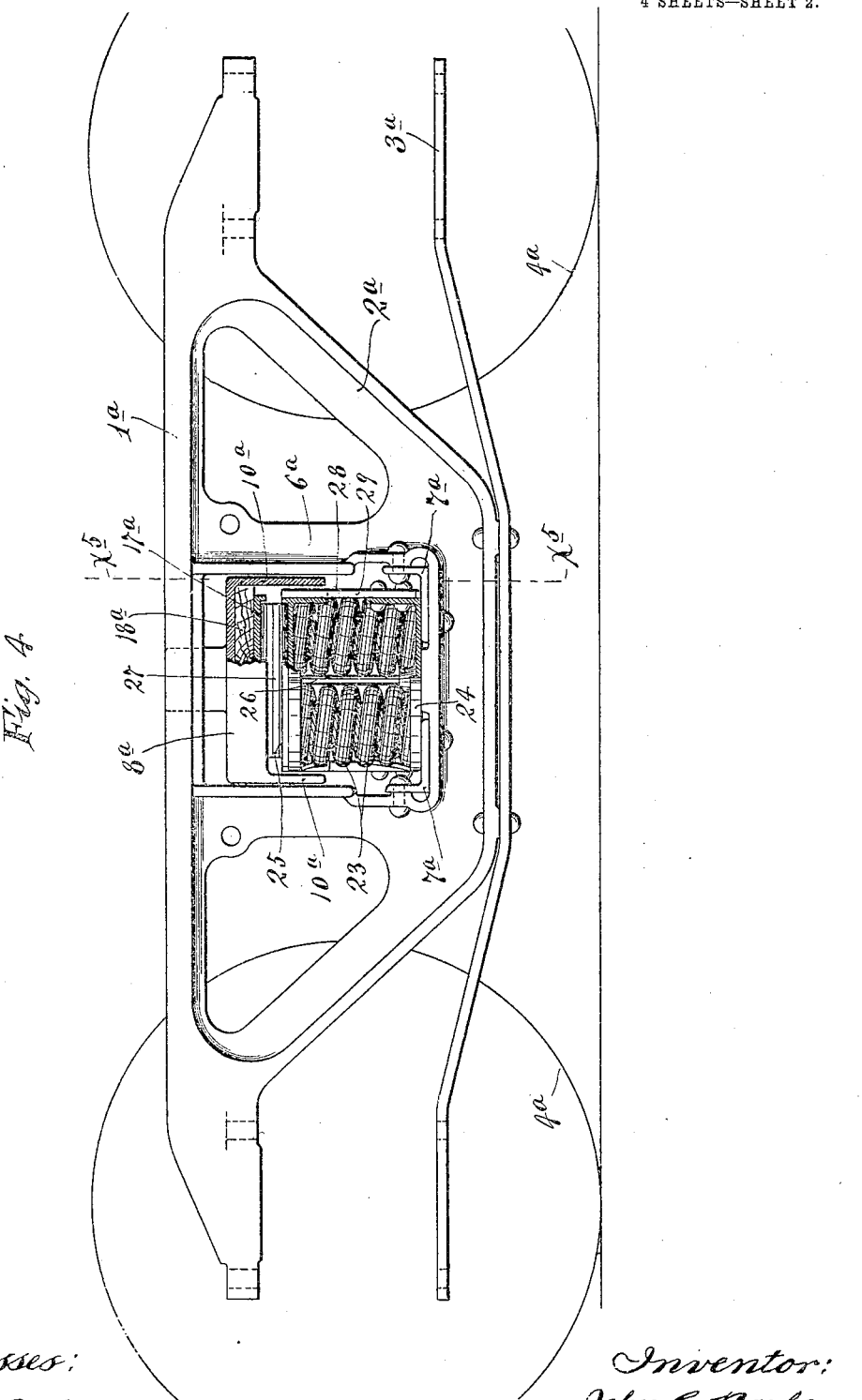

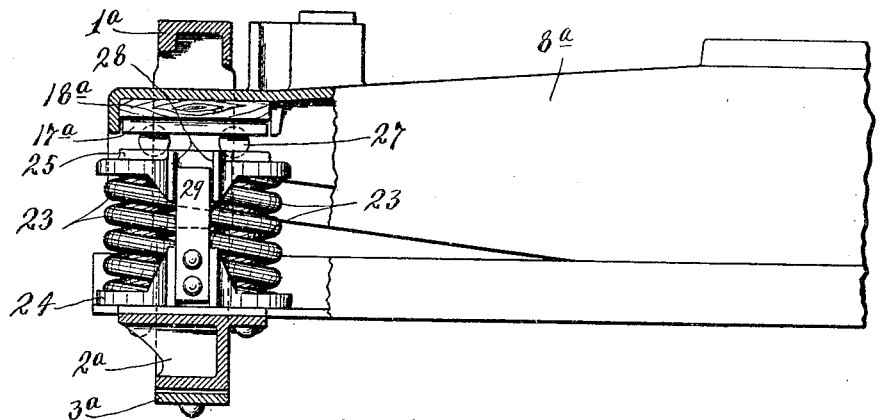
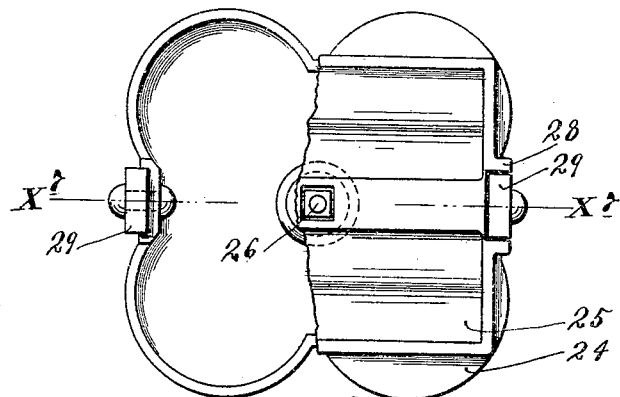
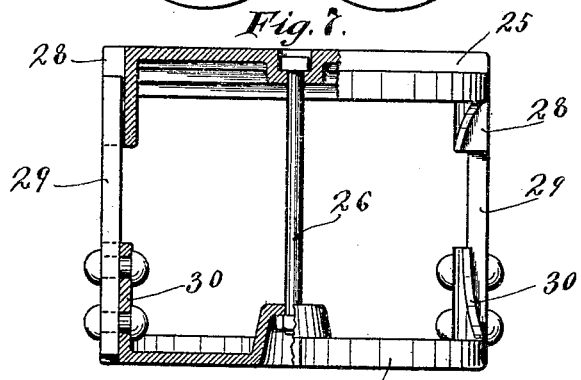

J. C. BARBER.
CAR TRUCK.
APPLICATION FILED APR. 22, 1910.
962,937.
Patented June 28, 1910.
4 SHEETS—SHEET 4.
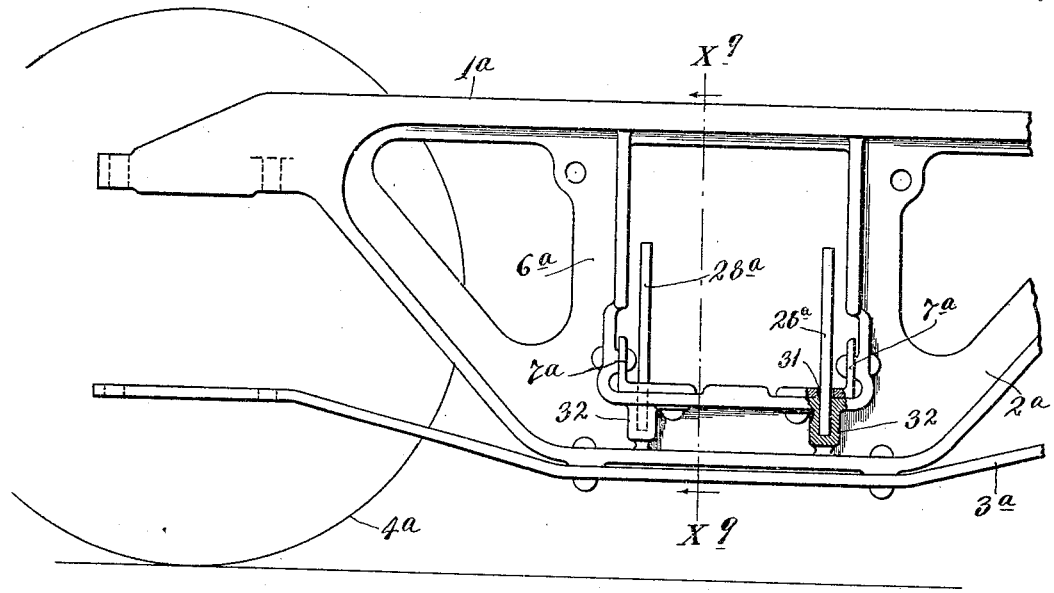
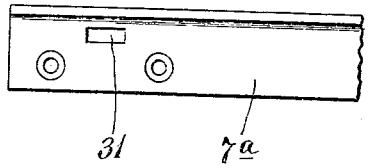
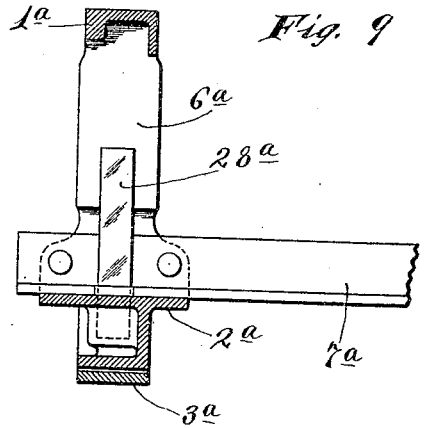
Witnesses:
W. H. Souba
A. H. Opsahl
Inventor:
John C. Barber,
By his Attorneys
Williamson & Merchant

UNITED STATES PATENT OFFICE.

JOHN C. BARBER, OF CHICAGO, ILLINOIS, ASSIGNOR TO STANDARD CAR TRUCK COMPANY, OF CHICAGO, ILLINOIS, A CORPORATION OF NEW JERSEY.

CAR-TRUCK.

962,937.  Specification of Letters Patent.  Patented June 28, 1910.

Application filed April 22, 1910. Serial No. 556,913.

*To all whom it may concern:*

Be it known that I, JOHN C. BARBER, a citizen of the United States, residing at Chicago, in the county of Cook and State of Illinois, have invented certain new and useful Improvements in Car-Trucks; and I do hereby declare the following to be a full, clear, and exact description of the invention, such as will enable others skilled in the art to which it appertains to make and use the same.

My invention relates to car trucks and particularly to car trucks known to the trade as the "Barber lateral motion truck."

In my prior Patent 660,614 of date October 30, 1900, entitled "Car truck", combined roller caps and spring bases were connected to end portions of the truck bolster by vertical guides and were caused to travel transversely of the truck, with the said truck bolster. In my prior Patent 779,574 of January 10, 1905, entitled "Car truck", combined spring caps and roller bases were extended through clearance passages in depending flanges of the truck bolster and were guides for vertical movements and held against lateral movements with the truck bolster, by the bolster columns or bolster guiding surfaces of the truck side frames. The principle of construction involved in this latter noted patent required reduction in the wearing surface of the truck bolster either by perforating or by reducing the vertical dimensions of the side flanges of the truck bolster at points where they engaged the bolster columns.

My present invention has for its object generally to improve the construction of car trucks in respect to the manner in which the truck bolster and combined spring caps and roller bases are connected to and guided by parts of or on truck side frames. This I accomplish by arranging the bolster columns to guide only the bolster and provide the truck side frames with guides for the combined spring caps and roller bases, which guides are independent of the bolster columns proper. This construction makes it possible to extend the bolster guiding portions of the bolster columns and the cap guiding devices through the same vertical zones; and the result of this is to make possible a maximum vertical depth of the bolster flanges for engagement with the bolster columns, and a maximum guiding surface on the spring caps or, more properly speaking, combined spring caps and roller bases, which latter feature is important to prevent tipping of the said combined spring caps and roller bases.

In the accompanying drawings which illustrate several forms of the invention, like characters indicate like parts throughout the several views.

Referring to the drawings, Figure 1 is a view chiefly in side elevation, but with some parts sectioned and other parts removed, showing a car truck embodying my invention; Fig. 2 is a fragmentary view, chiefly in transverse section, on the line $x^2$ $x^2$ of Fig. 1, some parts being shown in full; Fig. 3 is a detail in transverse section approximately on the line $x^3$ $x^3$ of Fig. 1, some parts being removed and some parts being broken away; Fig. 4 is a view corresponding to Fig. 1, but illustrating a modified construction; Fig. 5 is a fragmentary view chiefly in transverse section, approximately on the line $x^5$ $x^5$ of Fig. 4, but with some parts left in full; Fig. 6 is a plan view, with parts broken away, showing a sort of a spring cage removed from the truck; Fig. 7 is a view partly in elevation and partly in section on the line $x^7$ $x^7$ of Fig. 6; Fig. 8 is a view in side elevation showing a truck side frame embodying a modified form of my present invention, some parts being broken away and some parts being removed; Fig. 9 is a vertical section taken on the line $x^9$ $x^9$ of Fig. 8, some parts being broken away; and Fig. 10 is a detail in plan, showing one end of one of the truck transoms.

Referring first to the construction illustrated in Figs. 1, 2 and 3, it may be stated that the truck frame outlined is of substantially standard construction, the side frames of which are made up each of a top arch bar 1, a truss bar 2 and a bottom bar 3. The wheels 4, which are indicated only in diagram, have their axles journaled in axle boxes not shown, but which will be clamped in the usual way between the outer ends of the bars 2 and 3. The intermediate portions of the bars 1, 2 and 3 are tied together by nut-equipped column bolts 5 passed therethrough and through cast bolster columns 6. The base portions of the transversely opposite bolster columns 5 of the truck are riveted or otherwise rigidly secured to the vertical flanges of the cross transoms 7, the horizontal flanges of which are riveted or otherwise rigidly secured to the intermediate portion of the truss bar 2. The bolster column 8, shown in connection with this truck, is a cast bolster provided with deep depending longitudinally extended side flanges provided near their ends with vertically long or deep bolster engaging or wearing surfaces 9 that engage the flat parallel guiding surfaces 10 of the bolster column 6. The said bolster, near its ends, is also provided with longitudinally extended stop flanges 11, which permit limited endwise movements of the truck bolster laterally or transversely of the truck, but limits such movements. Spring bases 12 rest upon the end portions of the transoms 7 and the intermediate portions of the truss bars 2 and, as shown, are riveted to the former. Bolster supporting springs 13, as shown of double elliptical form, are seated on the spring base 12, and combined spring caps and roller bases 14 are seated on the said springs. The said springs, as shown, are provided with binding blocks 15 and 16 that engage seats, respectively, in the upper portions of the spring bases 12 and in the lower portions of the combined spring caps and roller bases 16. Roller caps or upper roller bearing plates 17 and coöperating shimming blocks 18 are located in seats formed in the under surface of the ends of the top plate of the bolster 8, and bearing rollers 19 are interposed between the said members 14 and 17. The said roller engaging members 14 and 17 are provided with the customary concave seats for engagement with the rollers. At their front and rear ends, the combined spring caps and roller bases 14 are provided with depending lugs 20 that work between the upwardly extended arms of bifurcated guide brackets 21. These guiding brackets 21 are located between the sides of the springs 13 and the adjacent column engaging flanges 9 of the truck bolster, and at their lower extremities, are rigidly secured, preferably, by rivets 22. The guides for the combined spring caps and roller bases are, therefore, independent of the bolster columns and of the truck bolster, and their guiding surfaces and the bolster guiding surfaces of the bolster columns extend through common vertical zones or, otherwise stated, are vertically overlapped and laterally offset. This, as is evident, provides for a maximum vertical extension or depth of the column engaging bolster flanges, without slotting the latter, and, at the same time, permits of a minimum space between upper and lower bars or members of the truck side frames.

In the construction illustrated in Figs. 4 to 7, inclusive, the top bar 1$^a$, truss bar 2$^a$ and bolster columns 6$^a$ are cast integral, but the bottom bar 3$^a$ and wheels 4$^a$ are of the same structure described in connection with Figs. 1, 2 and 3. The cast side frames are connected by angle bar cross ties or transoms 7$^a$. The truck bolster 8$^a$ is provided with depending column engaging flanges 10$^a$, and in its ends, it is provided with upper roller bearing plates 17$^a$ and shimming blocks 18$^a$. The chief difference between this construction and that disclosed in Figs. 1, 2 and 3 is in the arrangement of the bolster supporting springs in a sort of a cage formed by a spring base, a combined spring cap and roller base and guide bars. More specifically stated, the springs, which are coiled springs 23, are arranged in groups of four and each group is seated on a spring base 24 and supports a combined spring cap and roller bar 25. The two members 24 and 25 are centrally connected by a bolt 26 which limits the separating movements of the said members but permits the members 25 to be depressed to compress the springs. The spring bases 24 are seated on the horizontal flanges of the transoms 7$^a$ and on the intermediate lower portions of the cast side frames, and bearing rollers 27 are interposed between the said roller engaging members 25 and 17$^a$. The combined spring caps and roller bases are provided, at their front and rear ends, with depending vertically grooved guide lugs 28 that work on vertical guide bars 29, the lower ends of which are riveted and rigidly secured to upwardly extended grooved lugs 30 of the spring bases 24. In this construction, the guides for the combined spring caps and roller bases operate substantially as in the construction illustrated in Figs. 1, 2 and 3, but are removable from the truck side frames with the spring bases 24.

The construction illustrated in Figs. 8, 9 and 10 is the same as that illustrated in Figs. 4 to 7, inclusive, except that the guides 28$^a$ for the combined spring caps and roller bases are, at their lower ends, extended downward through perforations 31 in the horizontal flanges of the transoms 7$^a$ and are rigidly secured in pockets or seats 32 formed in the lower central portion of the cast truck side frames.

What I claim is:

1. A car truck having side frames formed with independent vertically extended relatively fixed guides for a truck bolster and for roller caps.

2. A car truck having side frames provided with laterally offset independent relatively fixed guides for a truck bolster and for combined spring caps and roller bases, the said two classes of guides being overlapped in a vertical direction.

3. In a car truck, the combination with truck side frames, a truck bolster, springs carried by said side frames, combined spring caps and roller bases supported by said springs, rollers on said spring caps and roller bases, upper roller bearing plates carried by said bolster and resting on said rollers, the said bolster having deep depending flanges engageable with bolster columns of said side frames, and guides for said combined spring caps and roller bases laterally offset from the bolster columns, overlapped vertically therewith, and rigidly secured in respect to said side frames, substantially as described.

4. A car truck having independent relatively fixed bolster and spring cap guides.

In testimony whereof I affix my signature in presence of two witnesses.

JOHN C. BARBER.

Witnesses:
L. W. BARBER,
A. M. LOVE.